Dec. 10, 1968 S. HIMMELSTEIN ETAL Re. 26,501

MULTI-CHANNEL ROTARY TRANSFORMER

Original Filed May 1, 1964

INVENTORS
Sydney Himmelstein
Howard S. Knaack
Richard S. Tveter

Hofgren, Wegner, Allen, Stellman & McCord
ATTORNEYS

United States Patent Office

Re. 26,501
Reissued Dec. 10, 1968

26,501

MULTI-CHANNEL ROTARY TRANSFORMER

Sydney Himmelstein, Park Ridge, Howard S. Knaack, Lake Bluff, and Richard S. Tveter, Glenview, Ill., assignors, by direct and mesne assignments, to S. Himmelstein and Company, Elk Grove Village, Ill., a corporation of Illinois Original No. 3,317,873, dated May 2, 1967, Ser. No. 364,129, May 1, 1964. Application for reissue Jan. 5, 1968, Ser. No. 698,981
9 Claims. (Cl. 336—120)

Matter enclosed in heavy brackets [ ] appears in the original patent but forms no part of this reissue specification; matter printed in italics indicates the additions made by reissue.

*ABSTRACT OF THE DISCLOSURE*

*A rotary transformer having a frame with spaced bearings therein, a shaft journalled in the bearings, a plurality of U-shaped rotor cores affixed to the shaft in axially-spaced relation, each rotor core having radially extending side walls confining a rotor coil, and a U-shaped stator core on the frame for each rotor, the stator core also having radially extending side walls confining a stator coil, each stator coil further including two substantially identical unitary gapless hemicylinders having a cylindrical portion integral with the stator core side walls to define a U-shape in radial section, the distance between the inner faces of the side walls of each stator core being greater than the distance between the outer faces of the side walls of the rotor core associated therewith, the stator cores each being mounted on the frame to dispose the side walls thereof in radially overlapping relation to the side walls of the associated rotor core.*

This invention relates to a rotary transformer, and, more particularly, to a device that is capable of transferring one or several channels of either or both data and power in electrical form, between a rotating shaft and a stationary member, and the provision of such constitutes an object of this invention.

Other objects and advantages of the invention may be seen in the details of operation and construction set down in this specification.

The invention is explained in conjunction with the accompanying drawing, in which—

Figure 1:
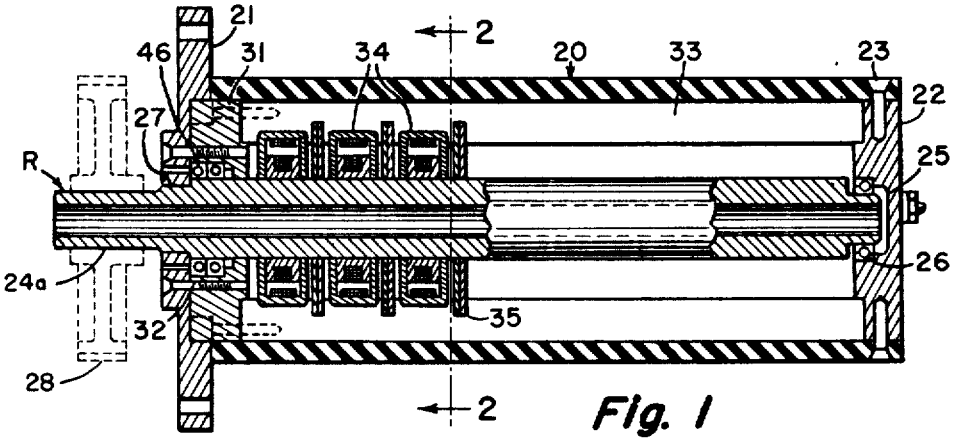
FIG. 1 is a longitudinal sectional view of a multi-channel rotary transformer constructed according to the teachings of the invention.
Figure 3:
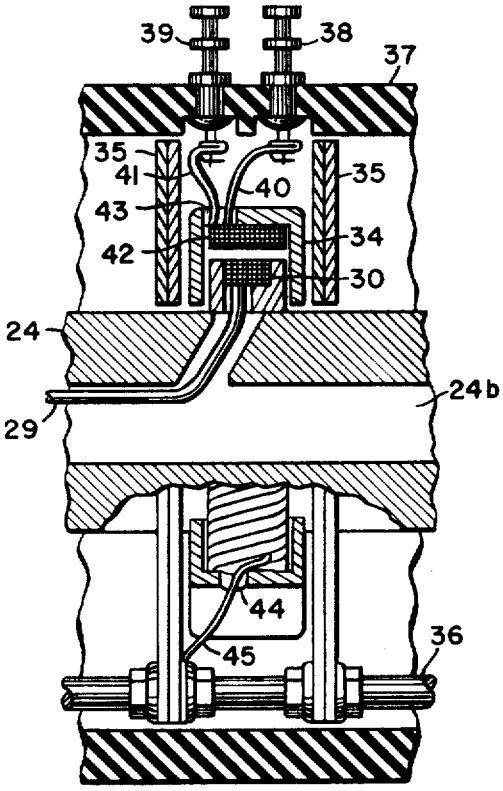
FIG. 3 is an enlarged fragmentary view of the details of a single transformer section showing rotor and stator, windings, and cores.

FIG. 3 contains the details of a single transformer section, and FIG. 1 shows several transformer sections assembled into a multi-channel unit. The rotor and stator core geometries shown in FIG. 3 minimizes the total leakage flux and, in addition, minimize the external leakage; i.e., that portion of the total leakage flux which finds its way outside of the external or stator structure.

Figure 4:
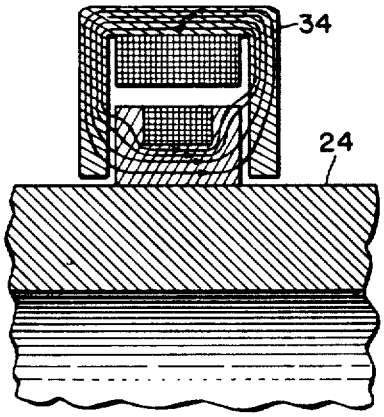
FIG. 4 is a schematic picturization of a portion of FIG. 3 and showing the lines of flux developed by the rotor and stator.

The major flux paths are shown schematically in FIG. 4. It will be seen that the air gap (necessary to accomplish rotation without mechanical contact) reluctance is minimized by the design of the rotor and stator core structures. There are two important air gap reluctances in this magnetic circuit; i.e., those between the two parallel sides of rotor and stator. Because the flux path is parallel to the gap between the two halves of the stator, that gap has no important effect on the magnetic circuit.

Returning to the two significant gaps, their magnetic reluctance is directly proportional to the gap length (distance between rotor and stator sides) and inversely proportional to the area of the parallel surfaces formed by the sides of rotor and stator cores. Because these areas are both figures of rotation, for small linear dimensions the resultant area becomes large so that practical (from a manufacturing viewpoint) air gaps can be used while maintaining very high magnetic circuit efficiency. Furthermore, with this configuration, as already noted, the total leakage flux (because the air gap reluctance has been minimized) is small. Thus, as in the case of any transformer, with leakage inductance minimized, it is possible to design a transformer that has extremely wide bandwidth; i.e., very high resonant frequency. Another important advantage of this core design is that by far the greatest portion of the small residual leakage occurs inside of the stator assembly where it cannot cause cross-talk; i.e., magnetic coupling from one transformer section to another.

Another advantage of this core configuration is that the cross-sectional area offered to the useful flux path has been maximized; i.e., the cross-sectional areas even in the relatively thin radial sections (because they are figures of rotation), are quite large. Therefore, this core design permits operation at higher flux levels for a given core volume and results in the achievement of very high volts per turn ratios and power levels for a given volume.

Still another advantage of this core geometry is that it inherently cancels the effect of radial run-out. Thus, it is seen that the net air gap is maintained constant even if the rotor assembly should have appreciable run-out. Stated in other words, as the clearance in one sector of the figure of rotation increases, it decreases in the other sector, and, because the coils are wound to produce radially symmetrical fields, the net coupling, as the rotor shaft turns with radial run-out, remains constant.

This same result obtains for any residual axial play. If there is residual axial play, the net reluctance between rotor and stator remains constant because as the clearance increases (and therefore the reluctance increases) on one side, it decreases (and therefore the reluctance decreases) by an equal amount on the other side—the net effect being inherent immunity to such variations. It will be recognized that the essential core characteristics described above may be obtained with minor variations in core geometry. However, the structure delineated in FIG. 3 is our preferred arrangement.

By way of emphasis, the essential features of these core structures are that they provide, by virtue of their geometrical configuration, low reluctance air gaps between rotor and stator, very small external flux leakage, and air gap symmetry both with respect to the axis of rotation and in the plane perpendicular to the axis of rotation. The low reluctance results from favorable use of areas of rotation in the design of the core sections. The air gap symmetry provides transformer electrical characteristics with inherent immunity from the effects of radial run-out and shaft end play.

Other advantages which accure from this design are high resultant volumetric efficiency for any given power and harmonic distortion requirement as well as unusually low total leakage (results in wide bandwidth) and outside leakage (results in low crosstalk). Furthermore, because the stator cores are "split" along their diameter, the resultant air gap is not critical and assembly of multi-channel units is facilitated.

In FIG. 1 the numeral 20 designates generally a casing or cylindrical housing for the rotary transformer and is equipped with end closures as at 21 and 22 suitably secured thereto. In the case of the end closure 22, radially extending bolts 23 are employed to secure the end closure 22 to the cylindrical housing 20. The end closure 22 is apertured for the extension of the rotor shaft 24 and also is recessed as at 25 to support one bearing 26.

The other end closure 21 is apertured as at 27 for the extension of the shaft 24. The shaft extension 24a is seen to be equipped with the gear 28 which provides rotational power for the shaft 24. Additionally, the shaft 24 is equipped with a hollow bore as at 24b for the purpose of supplying the electrical connections 29 (see FIG. 3) to the rotor winding 30.

Returning again to FIG. 1, the end closure 21 is seen to be bolted to a bearing support member 31 (the bolts being designated 32). Additionally the bearing carrying member provides one support for the alignment bars 33 (see also FIG. 2) which support and align the various stators 34.

Interposed between adjacent stators are laminated shields 35 (see also FIG. 3), and the shields are supported on a ground rod 36 extending between the end plates 21 and 22.

Referring particularly to FIG. 3, the numeral 37 designates a terminal board carrying terminals 38 and 39 which are in turn connected by means of wires 40 and 41 to the stator winding 42. The stator 34 is seen to be apertured as at 43 to permit access of the wires 40 and 41. An additional access is provided at 44 for the purpose of carrying a shield ground wire 45. The wire 45 is seen to be connected to the ground rod or boss 36.

Figure 2:
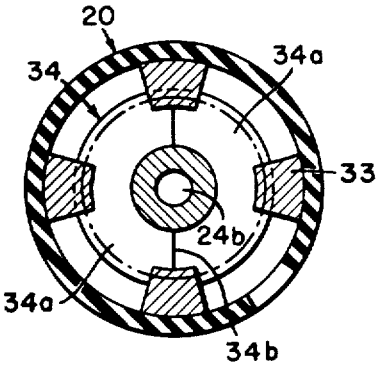
FIG. 2 is a transverse sectional view such as would be seen along the sight line 2—2 applied to FIG. 1.

Turning now to FIG. 2, it will be seen that the stator 34 is divided into portions 34a which are identical hemicylinders, mating along a diametral plane 34b. Supporting the hemi-cylinders 34a are the alignment bars 33 previously mentioned.

Turning now to FIG. 1, it is seen that the shaft 24 is supported at one end by means of duplex bearings 46. The bearings constrain the rotor shaft 24 at one end. The duplex bearings are designed with a fixed pre-load that eliminates axial shaft movement at the reference end, i.e., the end equipped with the driving means 28, until the axial shaft load reaches the fixed pre-load. This pre-load may be made greater than the expected rotor axial load. The other end of the rotor shaft is not constrained in the axial direction. The stator core 34 is positioned by the four slotted alignment bars 33. The alignment bars 33 advantageously have controlled dimensions from the shaft reference end (R in FIG. 1) to a reference surface on each stator face. The stator cores are then held in position against these reference surfaces for accurate alignment and are cemented or otherwise fastened to them.

FIG. 3 shows a method for making electrical connections to both the rotating and stationary coils. It also shows one method of insulating the coils from the core structures and additionally depicts one method of providing electrostatic shield between the rotor and stator winding.

These planar shields 35 are a lamination of highly permeable magnetic material (such as Mumetal alloy) with highly conducting material, or, alternatively, they are Mumetal or equivalent plated with a highly conducting material such as silver or copper. The purpose of these inter-channel shields is twofold; first, the presence of the conductor which is electrically connected to ground provides for electrostatic shielding between adjacent transformer channels. Second, the planar shield provides further magnetic shielding between adjacent channels both at extremely low frequencies (by virtue of the presence of highly permeable magnetic materials) and at extremely high frequencies (by virtue of the presence of highly permeable magnetic materials and good electrical conductors).

Referring to FIG. 1, it will be seen how several of these transformer core sections and shields are combined in a complete assembly. One practical method for making electrical connetcions is shown in FIG. 3. However, it will be obvious to those skilled in the art that many variations are possible; for instance, twisted wires could be substituted for the coaxial cables shown (29 in FIG. 3); coaxial connectors could be used in lieu of the terminals indicated on FIG. 3; but none of these changes are significant, nor, in fact, will they affect the overall performance except in a trivial and well known manner.

The alignment bars 33 may be advantageously made of the same metal as the rotor shaft 24. Thus, they have the same temperature coefficient of expansion as the shaft. The net result of such an arrangement is that, as the temperature varies over a wide range, the rotor and stator cores remain in fixed relation to one another and, in particular, the net magnetic reluctance of the air gaps remains fixed. Therefore, the leakage inductance of the transformer remains constant over wide ranges of temperature and its electrical characteristics are constant.

We claim:

*1.* A multi-channel rotary transformer comprising a frame providing spaced bearings, a shaft journalled in said bearings, means coupled to said shaft for rotating the same, a plurality of U-shaped rotor cores affixed to said shaft in axially-spaced relation, each rotor core having radially-extending side walls confining a rotor coil, and a U-shaped stator core on said frame for each rotor, said stator core also having radially-extending side walls confining a stator coil, each stator core further including two substantially identical unitary gapless hemicylinders having a cylindrical portion integral with said stator core side walls to define a U-shape in radial section, the distance between the inner faces of the side walls of each stator core being greater than the distance between the outer faces of the side walls of the rotor core associated therewith, said stator cores each being mounted on said frame to dispose the side walls thereof in radially-overlapping relation to the side walls of the associated rotor core so as to position said outer faces of said rotor core in confronting relation with said inner faces of said stator core whereby said rotor core is received within the hemicylinders constituting the associated stator core to provide a minimum-reluctance rotor transformer characterized by air gaps existing only between the side walls of said rotor and stator cores and between the dimetrally-arranged hemicylinders.

*2. A rotary transformer for use with a frame providing spaced bearings, a shaft journalled in said bearings, and means coupled to said shaft for rotating the same, said transformer comprising:*

*a radially outwardly opening U-shaped rotor core affixed to said shaft and having radially extending side walls confining a rotor coil, and*

*a radially inwardly opening U-shaped stator core on said frame defined by a plurality of segmentally annular unitary gapless members cooperatively defining an annular core arrangement confining a stator coil, each said member having a bight portion and radially extending side walls integral therewith, the distance between the inner faces of said stator core side walls being greater than the distance between the outer faces of the rotor core side walls, said stator core being mounted on said frame to dispose the stator core side walls in overlapping relation to the rotor core side walls so as to position said rotor core outer faces in confronting spaced relation with said stator core inner faces whereby said rotor core is received within the stator core to provide a minimum-reluctance rotary transformer characterized by air gaps existing only axially between the side walls of*

*said rotor and stator cores and annularly between the segmentally annular members.*

*3. The rotary transformer of claim 2 wherein said stator core side walls are radially substantially longer than the radial dimension of said rotor core.*

*4. The rotary transformer of claim 2 wherein said stator core side walls extend substantially to said shaft whereby said stator core cooperates with said shaft to effectively envelop said rotor core.*

*5. The rotary transformer of claim 2 wherein said stator core side walls are spaced apart a distance greater than the axial dimension of the stator coil.*

*6. The rotary transformer of claim 2 wherein a grounded permeable shield is disposed adjacent one of said stator core side walls and is arranged to extend radially a distance substantially greater than the radial dimension of said transformer.*

*7. The rotary transformer of claim 2 wherein said stator core members comprise substantially identical members.*

*8. The rotary transformer of claim 2 wherein said stator core members comprise substantially identical hemicylindrical members.*

*9. The rotary transformer of claim 2 wherein said frame includes an end wall, a grounded permeable shield member is disposed adjacent one of the stator core side walls, and the other of said stator core side walls is disposed adjacent said frame end wall.*

References Cited

The following references, cited by the Examiner, are of record in the patented file of this patent or the original patent.

UNITED STATES PATENTS

| | | | |
|---|---|---|---|
| 2,298,216 | 10/1942 | Lamberger et al. | 73—141 XR |
| 2,432,982 | 12/1947 | Braddon et al. | 336—123 XR |
| 3,179,909 | 4/1965 | Cheney | 336—120 |

LEWIS H. MYERS, *Primary Examiner.*

T. J. KOZMA, *Assistant Examiner.*

U.S. Cl. X.R.

310—68; 336—87, 123, 132